Feb. 18, 1958 L. V. DAY Re. 24,432

SOD CUTTER

Original Filed Jan. 15, 1954 2 Sheets-Sheet 1

Luther V. Day
INVENTOR.

BY Thomas A. O'Brien and Harvey B. Jacobson
Attorneys

Feb. 18, 1958 L. V. DAY Re. 24,432

SOD CUTTER

Original Filed Jan. 15, 1954 2 Sheets-Sheet 2

Luther V. Day
INVENTOR.

BY Clarence A. O'Brien and Harvey B. Jacobson
Attorneys

United States Patent Office

Re. 24,432

Reissued Feb. 18, 1958

24,432

SOD CUTTER

Luther V. Day, Malakoff, Tex., assignor to B. O. Warren, Palos Park, Ill.

Original No. 2,760,425, dated August 28, 1956, Serial No. 404,287, January 15, 1954. Application for reissue July 11, 1957, Serial No. 672,531

10 Claims. (Cl. 97—226)

Matter enclosed in heavy brackets [ ] appears in the original patent but forms no part of this reissue specification; matter printed in italics indicates the additions made by reissue.

This invention relates to a sod cutter and more specifically provides an attachment for all conventional sod cutting machines wherein the length of various sections of sod may be laterally severed.

An object of this invention is to provide a sod cuttter which laterally cuts sod at predetermined timed intervals.

Another object of this invention is to provide a sod cutter having an independent timing mechanism wherein the cutter will be actuated in accurate timed intervals.

A further object of this invention is to provide a sod cutter that is attached to a conventional sod cutting machine and driven therefrom with a timing mechanism independent of the machine and operating a clutch for actuating a vertically reciprocable cutting element for severing the sod into sections of predetermined length.

Yet another object of this invention is to provide a sod cutter which is simple in construction, easily attached to conventional sod cutting machines, efficient and accurate in operation, inexpensive to manufacture and well adapted for the purposes for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
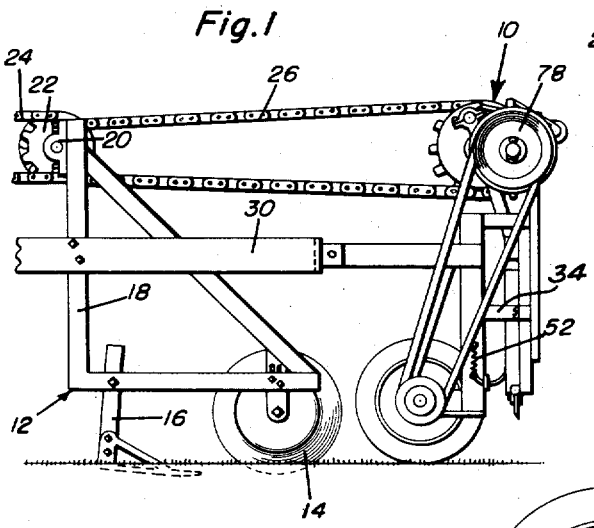
Figure 1 is a side elevational view of the sod cutter of this invention attached to a conventional sod cutting machine.
Figure 4:
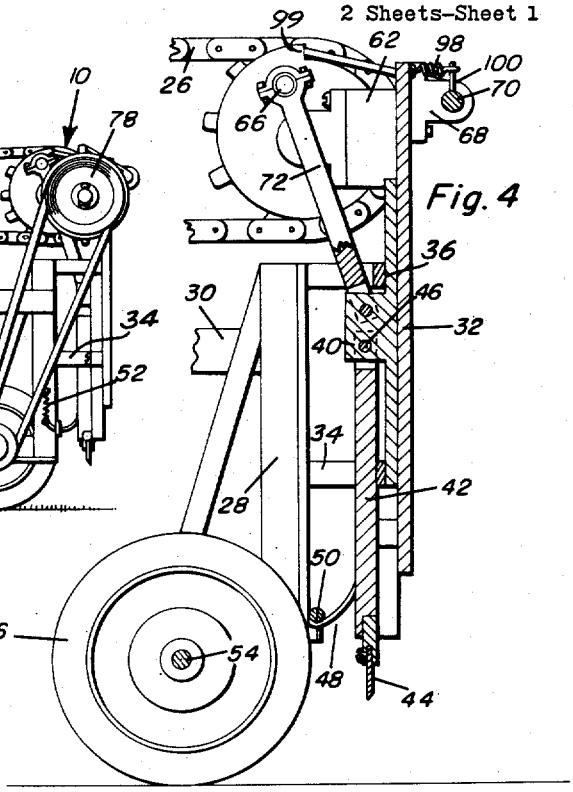
Figure 4 is a longitudinal, vertical section taken substantially along section line 4—4 of Figure 2 and showing the details of construction of the sod cutter attachment.
Figure 5:
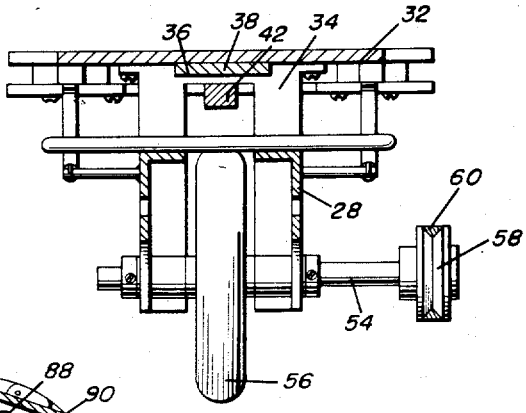
Figure 5 is a transverse, top plan section taken substantially along section line 5—5 of Figure 2 showing the details of the timing wheel.
Figure 7:
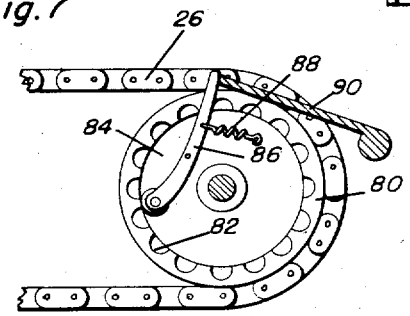
Figure 2:
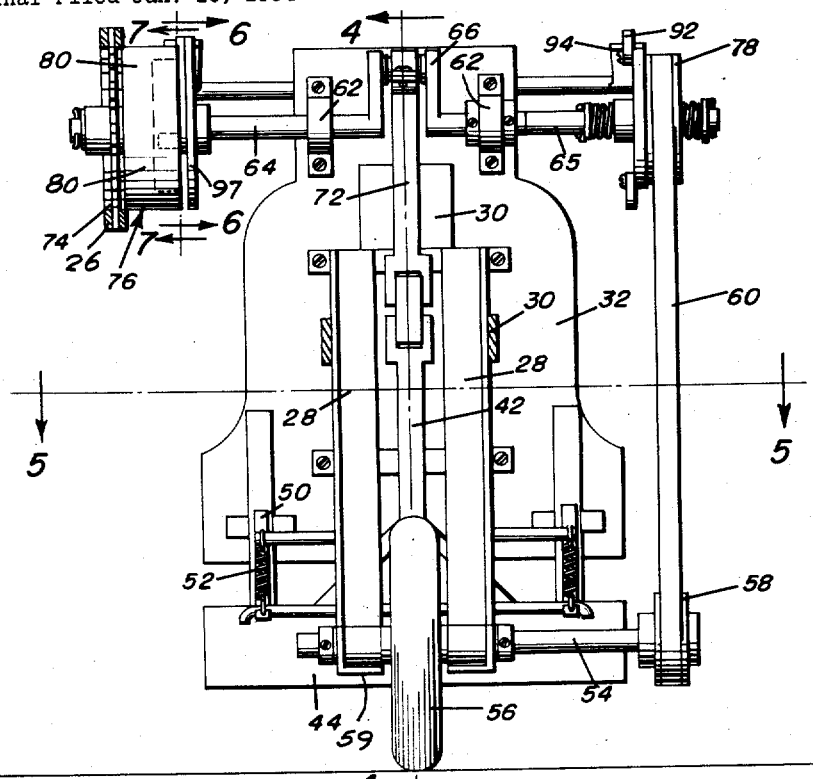
Figure 2 is an end elevational view looking at the sod cutter from the sod cutting machine with portions being shown in section.

Referring now specifically to the drawings, it will be seen that the numeral 10 generally designates the sod cutter of this invention for attachment to the forward portion of a conventional sod cutting machine, generally indicated by the numeral 12. The sod cutting machine 12 includes a ground engaging wheel 14, a sod-cutting and lifting device 16 and brace means 18 for supporting the wheel 14 and the sod cutting member 16. The upper end of the brace member 18 is provided with a rotatable axle 20 having a pair of sprocket gears thereon and one of the sprocket gears 22 is driven by a chain 24 connected to the power source (not shown) of the sod cutting machine 12 for rotating axle 20. The other sprocket gear 22 rotated by axle 20 drives an endless chain 26 which supplies power to the sod cutter 10 of this invention.

The sod cutter 10 includes a vertically disposed frame member 28 mounted forwardly of the brace means 18 by a pair of adjustable brackets 30. An enlarged forward plate 32 is mounted vertically on the vertical frame 28 in forwardly spaced relation thereto by suitable bracket means 34. Each of the brackets 34 includes a centrally recessed portion 36 for slidably receiving a vertically reciprocal cross-head 38. The cross-head 38 includes an attaching block 40 for pivotally attaching a cutter bar arm 42 having a transverse cutter bar 44 mounted on its lower end. The cutter bar arm 42 is pivotally attached to the block 40 by pivot pin 46 and a resilient spring member 48 in the nature of an elongated leaf spring has an end portion in engagement with the cutter bar 42, thereby permitting the cutter arm 42 to swing rearwardly against the action of the spring 48 when the cutter bar 44 is engaged with the sod and the sod cutting machine 12 is moving forwardly. The leaf spring 48 is passed under a transverse rod 50 and is connected to a coil spring 52 for retaining the leaf spring 48 and the cutter bar arm 42 in proper relation. At the bottom of the frame 28 and on a rearward extension thereof is mounted an axle 54 carrying a ground engaging timing wheel 56 and one end of the axle 54 is a V-belt pulley 58 thereon. One side of the pulley 58 is threadedly engaged with the axle 54 for longitudinal movement thereby providing a pulley which will change diameter thereby changing the speed of the V-belt 60 which passes over the pulley 58. As will be seen, the frame 28 includes a pair of transversely spaced horizontal members 59 forming suitable supports for the axle 54 in a conventional manner. The upper end of the plate 32 is provided with projecting bearing blocks 62 for rotatably supporting a crankshaft 64 having an eccentric crank 66 mounted thereon and on the opposite side of the plate 32 from the bearing block 62 is provided a pair of bearing blocks 68 for rotatably journaling a shaft 70. The crank 66 on the crankshaft 64 has a connecting rod 72 connecting the crank 66 with the attachment block 40 on the cross-head 38. At one end of the shaft 64 is secured a sprocket gear 74 which receives the sprocket chain 26 for driving the shaft 64 through a clutch member 76 to be described hereinafter. On the end of a separate countershaft 65 is mounted a V-belt pulley 78 for receiving the V-belt 60 and being driven thereby.

Figure 3:
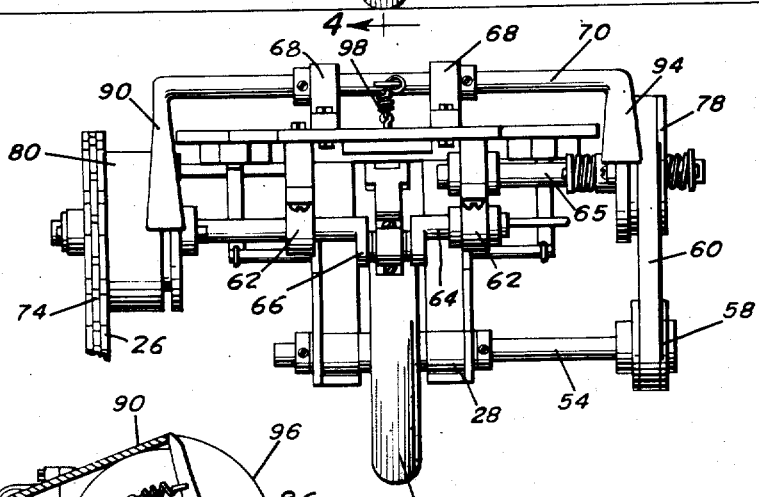
Figure 3 is a top plan view of the construction of Figure 2.
Figure 6:
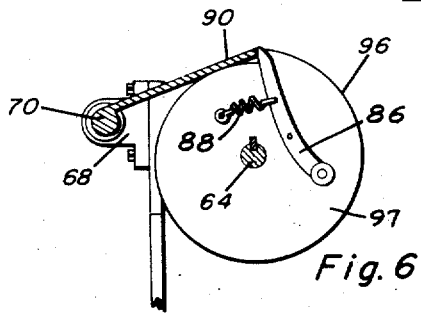
Figure 6 is a detail section taken substantially along the section line 6—6 in Figure 2 and looking in the direction of the arrows showing the details of construction of the clutch mechanism; and, Figure 7 is a detail vertical section taken substantially along section line 7—7 of Figure 2 and looking in the direction of the arrows showing further details of the clutching mechanism.

The clutch mechanism 76 includes a hollow drum 80 having a plurality of semi-circular recesses 82 thereon and a projecting circular member 84 is secured to the shaft 64 and a pivoted dog 86 is secured to the circular member 84 and includes a spring 88 for urging the dog 86 about its pivot axis into engagement with one of the recesses 82 thereby rotating the shaft 64 with the drum 84 which is rigid with the sprocket gear 74. The dog 86 is held out of engagement with the recesses 82 by a stop member 90 rigidly attached to the shaft 70 which is actuated by tripping dogs 92 positioned on the pulley 78 at the end of the shaft 65. A similar stop member 94 is provided on the opposite end of the shaft 70 from the stop member 90, and the stop member 90 rides about the peripheral surface 96 of plate 97 keyed to shaft 64 for a complete revolution and then engages the recessed latch projection or abutment 99 on the surface 96 thereby stopping the rotational motion of the shaft 64 until the stop member 90 is released by the action of the tripping dogs 92 on the operating stop member 94 at the opposite end of the shaft 70. A return spring 98 is positioned between an upstanding lug 100 on the shaft 70 and plate 32 for returning the stop members 94 and 90 to their original positions to be engaged by the dogs 92 and the surface 96. It will be seen in Figure 3 that the shaft 64 terminates at the bearing journal 62 and the short stub shaft 65 supports the pulley 78 and the tripping *dogs* [lugs] 92 for operation in an obvious manner.

The operation of the device will be readily understood. Power is transmitted through the chain 26 to the shaft 64 through the clutch 76 which is operated at timed intervals by the timing wheel 56 rotating the adjustable pulley 58, thereby rotating the shaft 65 along with the pulley 78. The tripping dogs 92 mounted on the pulley 78 actuate the shaft 70 thereby releasing the stop member 90 permitting the dog 86 to be pivoted about its pivotal axis for engaging one of the recesses 82 thereby rotating the shaft 64 and actuating the cutter blade knife 44. The stop 90 rides around the cam surface 96 for a complete revolution thereof and then engages the latch projection in the surface 96 thereby stopping the motion of the shaft 64 and releasing the dog 86 from the recesses 82. As the blade 44 engages the sod, the forward motion of the sod cutting machine 12 pivots the cutter arm 42 about its pivot pin 46 against the action of the leaf spring 48. When the blade 44 is raised from the sod, the leaf spring 48 returns the cutter arm 42 to its original position ready for another cycle of vertical reciprocation. Obviously, the device may be constructed of any readily obtainable materials and may be easily attached to a conventional sod cutting machine.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

I claim:

1. A sod cutter for attachment to the front end of a sod-cutting machine comprising a vertically disposed frame, a pair of brackets secured to said frame and adapted to be attached to a machine, a vertical plate secured to said frame in spaced parallel relation, a vertically reciprocating cross-head slidable on said plate, a sod cutting element carried by said reciprocating cross-head, and means for actuating said cross-head at predetermined intervals whereby the sod will be cut into desired lengths, said means including a one revolution dog clutch, and a timing wheel engaging the ground surface and actuating the dog thereby operating said clutch at predetermined intervals dependent upon the forward speed of the sod-cutting machine, said plate including guides for the cross-head, said sod-cutting element being pivotally secured to said cross-head for limited rearward swinging movement, and spring means resiliently resisting the swinging movement of said sod-cutting element.

2. A sod cutter for attachment to a sod-cutting machine having a power take-off mechanism, said attachment comprising a vertically disposed frame having a vertically disposed plate mounted thereon, bracket means mounting said frame on the sod-cutting machine, a vertically reciprocal *cross-head* [crosshead] slidable on said plate, guide means on said plate for guiding the reciprocation of said *cross-head* [crosshead], a cutter element resiliently pivotally mounted on said *cross-head* [crosshead], a crankshaft journaled on said frame, a connecting rod between the *cross-head* [crosshead] and the crankshaft, a gear journaled on said crankshaft, said gear being driven from the power take-off mechanism of the machine, a clutch mechanism for interconnecting the gear and crankshaft for one revolution of the crankshaft for moving the cutter element one cycle of operation, and means operative in response to the distance traveled by the sod cutter for actuating said clutch mechanism thereby drivingly connecting the gear to the crankshaft, said clutch mechanism including means for disengaging the gear from the crankshaft after the crankshaft has been rotated one revolution.

3. The combination of claim 2 wherein said clutch mechanism includes a plate rigidly mounted on the crankshaft in facing relation to the gear, said gear having a plurality of recesses therein, a spring urged dog on said plate for selective engagement with the recesses, said dog having an arm extending beyond the periphery of the plate, a radial stop abutment on the periphery of the plate, a stop member for releasable engagement with the surface of the plate and the arm of the dog whereby the stop member will hold the dog out of engagement with the recesses and engage the stop abutment for preventing rotation of said crankshaft until released by said distance responsive means.

4. The combination of claim 3 wherein said distance responsive means includes a ground engaging gauge wheel rotatably supported on said frame, a countershaft journaled on said frame adjacent said crankshaft, means drivingly interconnecting said gauge wheel and countershaft, and tripping dogs on said countershaft for actuating said stop member for temporarily lifting the stop member away from the dog arm and stop abutment whereby the dog will lock the gear to the plate for rotating the crankshaft one revolution until the arm and stop abutment are engaged by the stop member.

*5. A sod cutter for attachment to a sod-cutting machine having a power take-off mechanism, comprising: a vertically disposed frame secured to the sod-cutting machine; a crankshaft journaled in said frame; guide means on the frame disposed in a generally upright manner; a cutter element slidably mounted in said guide means and extending transversely of the frame; a connecting rod operatively connecting said cutter element to the crankshaft whereby rotation of the crankshaft drives the cutter element through a sod-cutting cycle; a rotatable member journaled on the crankshaft and adapted to be driven from the power take-off mechanism of the sod-cutting machine; a clutch mechanism for interconnecting the rotatable member and the crankshaft to turn said crankshaft through one revolution; disengaging means for disconnecting the rotatable member from the crankshaft to limit the crankshaft to one revolution each time the clutch mechanism is engaged; and means operable in response to the distance traveled by the sod cutter for actuating the clutch mechanism and drivingly connecting the rotatable member to the crankshaft.*

*6. In a sod cutting machine adapted to be driven over the ground to sever a continuous strip of sod from a sodded area, mechanism for transversely cutting each strip of sod into sod lengths, comprising: a frame secured to the sod-cutting machine; a crankshaft journaled in the frame; a rotatable member journaled on the crankshaft, said rotatable member being adapted to be continuously rotated when the sod-cutting machine is driven over the ground; guide means disposed on the frame in a generally upright manner; a cutter blade extending transversely of the frame and guided by said guide means for reciprocation in a generally upright path, said cutter blade being pivotally connected with the crankshaft whereby rotation of the crankshaft drives said cutter blade in said path through a sod-cutting cycle; a one revolution clutch mechanism for interconnecting the rotatable member and the crankshaft to drive said cutter blade downwardly and sever a sod length; and means operable in response to the distance traveled by the sod-*

*cutting machine for actuating the clutch mechanism and drivingly connecting the rotatable member to the crankshaft.*

*7. Mechanism as specified in claim 6, in which the distance responsive means for actuating the clutch is adjustable to vary the distance traveled with respect to the clutch actuation so that the lengths of sod being severed can be varied.*

*8. Mechanism as specified in claim 5, in which said distance responsive means includes a ground engaging wheel, a circular rotatable element journaled in the frame and carrying a tripping dog on its periphery, a connecting drive extending between said wheel and said rotatable element, and clutch actuating lever means on the frame intermittently engageable with said tripping dog and said clutch mechanism whereby advancement of said wheel over the ground intermittently causes engagement between said tripping dog and said lever means to actuate said clutch mechanism and drive the cutter blade through a cutting cycle.*

*9. A sod cutter for attachment to a sod-cutting machine, comprising: a frame adapted to be secured to said sod-cutting machine; upright guide means secured to the frame; a reciprocating cross-head provided with a sod-cutting element, said cross-head being slidably mounted in the guide means for movement through a sod-cutting cycle; a clutch mechanism mounted on the*

*frame and intermittently engageable with a source of power of the sod-cutting machine; connecting means operatively joining said clutch mechanism and said cross-head to drive the cross-head through said sod-cutting cycle each time the clutch mechanism is actuated; and means operable in response to the distance traveled by the sod cutter for engaging the clutch mechanism with the source of power to drive the cross-head through a sod-cutting cycle.*

*10. A sod cutter as specified in claim 9 in which the means operable in response to the distance traveled includes a timing wheel engaging the ground surface, said timing wheel being operatively connected to said clutch mechanism to intermittently cause engagement of said clutch mechanism with the source of power at predetermined intervals dependent upon the forward movement of said timing wheel over the ground surface.*

References Cited in the file of this patent or the original patent

UNITED STATES PATENTS

| | | |
|---|---|---|
| 1,732,972 | Knipfing | Oct. 22, 1929 |
| 2,164,246 | Kirkpatrick | June 27, 1939 |
| 2,284,826 | Kroeger | June 2, 1942 |
| 2,345,425 | Phillips | Mar. 28, 1944 |
| 2,689,610 | Myers | Sept. 21, 1954 |